United States Patent Office 3,168,465
Patented Feb. 2, 1965

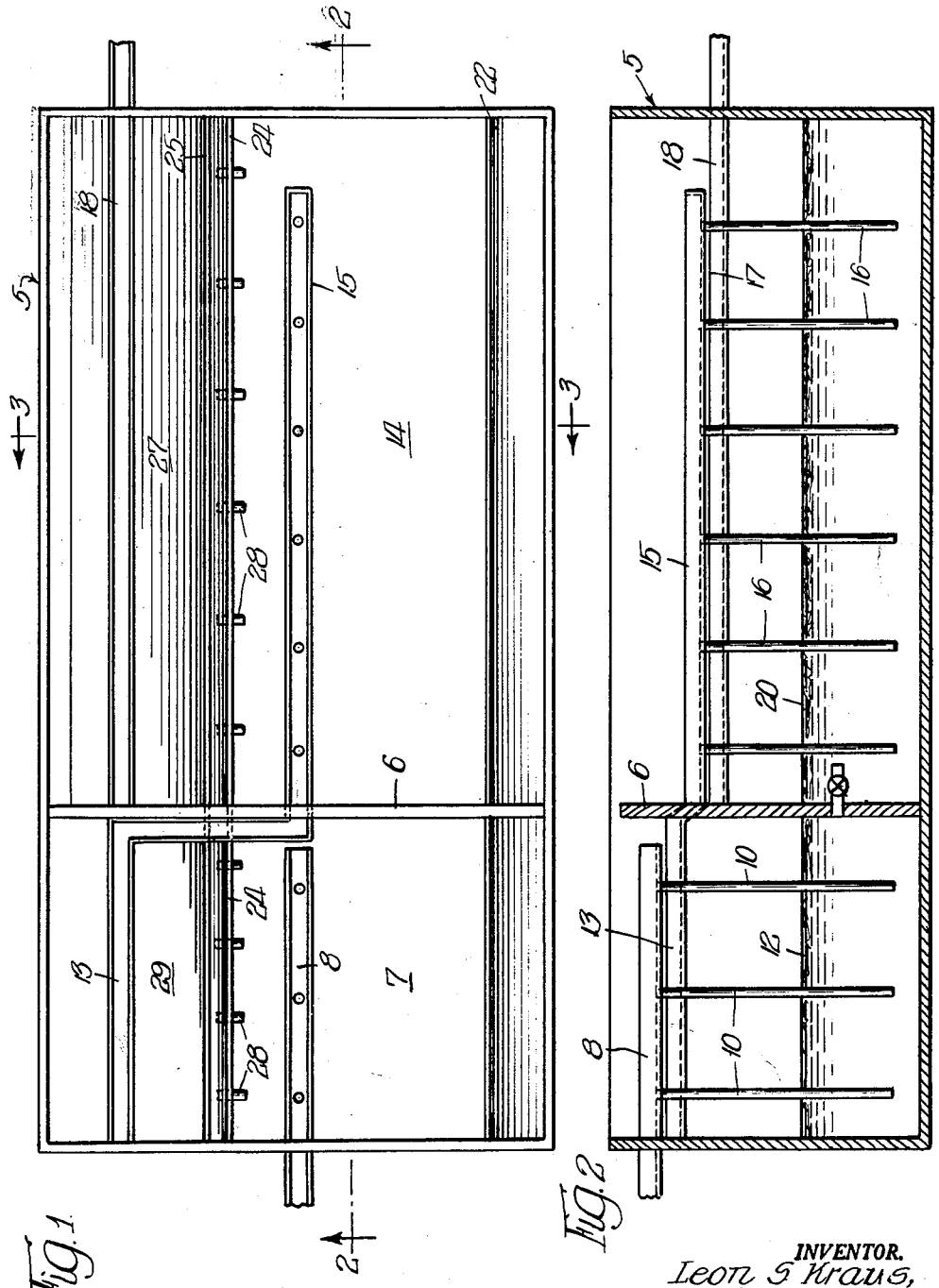

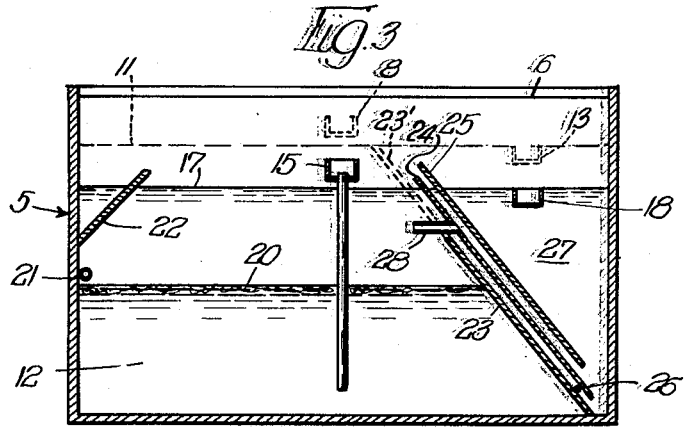
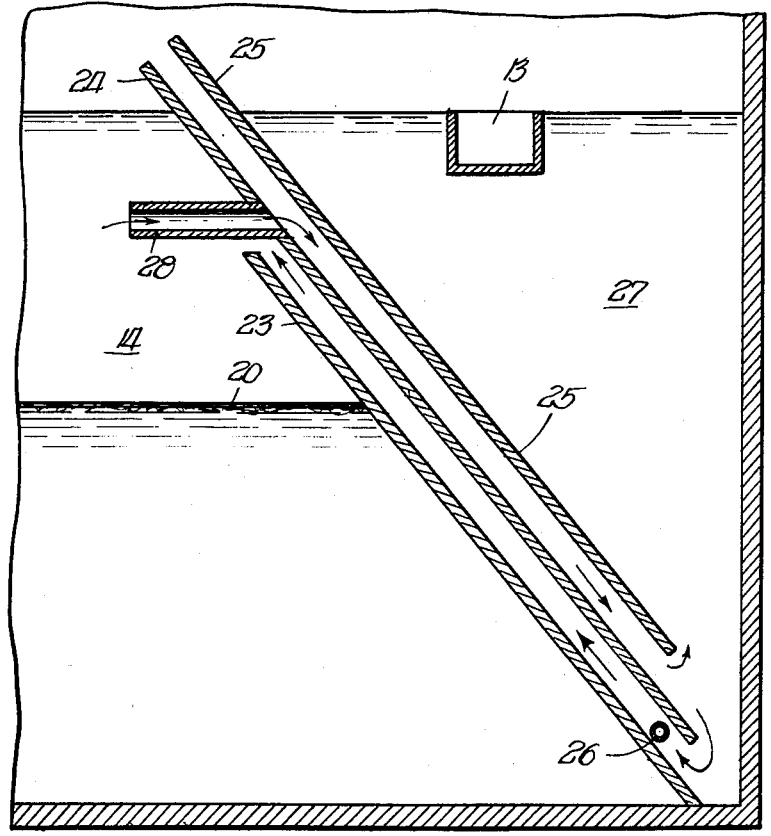

3,168,465
ANAEROBIC-AEROBIC SEWAGE TREATMENT
AND APPARATUS THEREFOR
Leon S. Kraus, 1001 W. Moss Ave., Peoria, Ill., and
Edwin B. Falls, Jr., 207 Twin Oaks Court, East
Peoria, Ill.
Filed May 31, 1960, Ser. No. 32,929
12 Claims. (Cl. 210—7)

This invention relates, generally, to innovations and improvements in process and apparatus for treatment or purification of sewage and industrial wastes, especially applicable to small sewage or waste treatment works. The process and apparatus of the present invention are, for example, especially adapted for treating and purifying the sewage of subdivisions or isolated industrial plants which do not have ready access to a large, attended sewage treatment or waste disposal plant. A basic feature of the invention is the combined anaerobic and aerobic treatment of sewage or waste in different strata in the same compartment.

Small scale plants or installations for purifying and treating sewage or like industrial wastes have been known and available for some time. Basically, these plants or installations depend upon the activated sludge process, and modifications thereof, and these plants have been subject to the following shortcomings:

(1) Inability to concentrate residual sludges to a sufficient solid content for economical sludge disposal.

(2) Scum formation due to accumulation of fats or other low density materials which are not oxidized by the aerobic microorganisms.

(3) Loss of suspended solids in the purified effluent due to flotation of activated sludge in the settling tanks as a result of nitrification followed by denitrification.

(4) Inadequate return sludge facilities which limit the concentration of activated sludge that can be settled and which ulimately results in the loss of suspended solids in the effluent.

(5) Frothing produced above the aeration tanks which constitutes a health hazard and nuisance in the neighborhood of the treatment works, especially when the froth becomes air-borne and distributed in the area.

(6) High installation and operating costs.

It has been discovered in accordance with the present invention that by conducting microbiological anaerobic and aerobic waste treatment simultaneously in the same compartment and by using certain other innovations, each and all of the above disadvantages which characterize conventional sewage and industrial waste purification plants and processes, can be overcome.

Accordingly, the object of the present invention, generally stated, is the provision of a process and apparatus for the purification of sewage or industrial waste, especically applicable to small waste treatment works, which are free from the above enumerated shortcomings and objections which characterize the processes and apparatus heretofore used for this purpose.

A more specific object of the invention is the provision of novel sewage and waste treatment or purification process and apparatus wherein microbiological anaerobic and aerobic functions are carried out simultaneously in the same compartment.

Still another important object of the invention is the provision of such a novel process and apparatus wherein air normally used for providing the dissolved oxygen for an activated sludge treatment is also used as the means for returning large proportions of activated sludge from a settling compartment to the aeration zone, or if desired, to a bottom layer of anaerobic sludge.

Another important object of the invention is such a novel process and apparatus wherein the volume of activated sludge returned from the settling tank or zone to the aeration zone or compartment is many times, e.g. 20 to 40, the amount or proportion normally returned in an activated sludge operation.

Another important object of the invention is the provision of such a novel process and apparatus wherein the returned or recycled activated sludge has dissolved in it a large proportion of the dissolved oxygen required by the aerobic process.

Still another important object of the invention is the provision of such a novel process and apparatus wherein there is a primary compartment and a secondary compartment, the nitrified effluent from the primary compartment being discharged to the secondary compartment anaerobic zone wherein denitrification takes place and the secondary settling compartment is therefore not affected by floating sludge due to denitrification therein.

A further important object of the invention is the provision of such a novel process and apparatus wherein anaerobic fermentation and aerobic oxidation (activated sludge) are simultaneously carried out in superimposed liquid strata or layers with no excess activated sludge being formed which would require separate treatment or disposal.

A further object of the invention is the provision of a novel process and apparatus of the type described wherein the concentration of the sludge produced in the bottom of the primary and secondary treatment compartments or zones, is much higher than can be achieved conventionally, e.g. 15% solids vs. 3% solids.

Another important object is the provision of such a novel process and apparatus wherein incoming sewage or waste is introduced below a strata or layer of anaerobic sludge of high density or solids concentration so that the waste is filtered therethrough and excellent removal of suspended solids is obtained simultaneously with the efficient action of anaerobic organisms during passage up through the lower strata to a supernatant layer or strata of aerobic or activated sludge treatment.

Still another object of the invention is to provide a novel process and apparatus of the type and character described wherein aeration-liquor solids concentrations of very high levels are obtained in one aeration compartment at no additional operating costs, and wherein effluent discharged from another aeration compartment or zone contains very low levels of suspended solids concentrations, and with the sludge volume index being substantially lower (e.g. about 50) than in plants now in use.

Still another object of the invention is the provision of such an apparatus or installation for simultaneously subjecting sewage or other wastes to a lower strata anaerobic treatment with high density solids anaerobic sludge, and to a superposed strata aerobic treatment with aerobic organisms or activated sludge, and including baffling and placement of air distribution lines so as to obtain an efficient return of large proportions of activated sludge from the bottom of a settling compartment to the superposed activated sludge treatment strata or, if desired, to the lower strata of anaerobic sludge.

Still another object of the invnetion is to reduce air requirements and tank volume normal for the activated sludge process, thereby reducing operating and initial costs, by substitution of anaerobic sludge treatment for a substantial portion of the normal aerobic sludge oxidation.

Certain other objects of the invention will, in part, be obvious and will in part appear hereinafter.

For a more complete understanding of the nature and scope of the invention reference may now be had to the following detailed description thereof taken in connection with the accompanying drawings wherein:

FIG. 1 is a top plan view of a sewage treatment or purification installation made in accordance with the present invention;

FIG. 2 is a vertical sectional view taken on line 2—2 of FIG. 1;

FIG. 3 is a transverse vertical sectional view taken on line 3—3 of FIG. 1; and

FIG. 4 is an enlarged, fragmentary view of the right hand portion of FIG. 3.

Referring to the drawings the installation therein shown is made in a tank 5 formed of steel, concrete or other water-holding material which may be 45 feet long, 22.5 feet wide and 14 feet deep. It will be understood that these dimensions are illustrative and that tanks of other sizes, proportions, and shapes may be used to suit the particular installations. The tank is divided into 2 compartments by a water-tight baffle or separator wall 6 so that the left-hand compartment is about one-half the size of the right-hand compartment. Raw sewage or industrial waste to be treated is introduced as influent into compartment 7 at the left which constitutes a primary compartment in this installation. The influent is introduced, or delivered into a distributor or header 8 which may take the form of a wooden or metal trough which is approximately 1 foot by 1 foot in cross section. Coming down from the trough 8 at spaced intervals are down-comers 10—10 which extend down to adjacent the bottom of the tank so as to discharge the influent adjacent the bottom. The down-comers 10 may take the form of metal pipes, or of wooden conduits fabricated from one-by-sixes, so as to give an inner cross section of 5 inches by 5 inches. Suitable weirs are placed and used in the trough 8 so that the incoming influent is distributed approximately equally between the downcomers 10—10.

The liquid level in compartment 7 is indicated at 11 (FIG. 3) and because the trough 8 is above this liquid level there will be gravity discharge of the influent, a suitable discharge being at the flow rate of 0.3 foot per second through the down-comers 10. The water level 11 may be at approximately the 10 foot depth and in the lower portion of the compartment 7 there is a body or strata of anaerobic sludge the upper level of which is indicated at 12. Actually, this level 12 fluctuates over a period of days between a depth as low as 2 feet to as high as 5 feet, but the demarcation remains quite definite during proper operation. This lower sludge layer will be further described below, but it has a solids concentration of approximately 15% and has an apparent consistency of say a thin mud when the latter is stirred.

The primary treatment compartment 7 is provided at the desired water level therein with an effluent discharge conduit or trough 13 which may take the form of a trough, 1 foot by 1 foot. It will be seen that this trough 13 is L-shaped in plan view and extends adjacent one side of the compartment between opposite ends thereof, then turns at the separator or baffle 6 and follows this along to the center where it passes through an opening and continues into the secondary treatment compartment 14 as the distributor trough 15. As in compartment 7, there are six down-comers 16—16 coming down from the trough 15 which terminate slightly above the floor of the compartment. It should be mentioned (and this will be noted in FIG. 2) that the level of the trough 15 in compartment 14 is slightly below that of the discharge effluent trough 13 in compartment 7 so that gravity flow will take place from one compartment to the other. The trough 15 is also above the water level 17 (FIG. 3) in compartment 14 so that the primary compartment effluent in the trough 15 will discharge by gravity from the bottom ends of the down-comers 16. The liquid level 17 in compartment 14 is below the liquid level 11 in compartment 7, being determined by the level of the discharge effluent trough 18 which runs along one side of the compartment 14 and may be aligned with the leg of the effluent trough 13 in the compartment 7.

There is also a layer or strata of anaerobic sludge in the bottom of the secondary aeration compartment 14 the upper level of which is indicated at 20 and which may fluctuate and be the same or different from that of the sludge level 12 in compartment 7.

In each of the compartments 7 and 14 the body of liquid above the sludge strata 12 and 20, respectively, constitutes an aeration zone wherein aerobic oxidation of the activated sludge type is being continuously conducted under conditions of induced turbulence.

Referring to FIG. 3 of the drawings it will be noted that there is an air distributor line 21 provided along one (the left) side wall of the tank 5 at a level above which the lower sludge layers 12 and 20 do not normally rise. This air line 21 is for the purpose of supplying part of the normal air supply for the aeration zone. The air discharges through orifices located along the line 21 in a well known manner. Extending along the same side wall of the tank 5 above the air line 21 is an overhanging baffle 22 the purpose of which is to deflect the current of liquid and air which rises along this side wall above the air line 21 across the top surface 11 thereby producing turbulence at the surface.

Extending along the opposite side wall of the tank 5 is a special multi-baffle partition which can be best described in connection with FIG. 4. It will be seen that there are three parallel and spaced apart baffles 23, 24 and 25 in sandwich formation. Baffle 23 is the lowermost and it extends from the bottom right-hand corner of the tank, as viewed in FIG. 3 upwardly at an angle of approximately 60°, and from the separator wall 6 to the right end of the tank as viewed in FIG. 1. Spaced above the baffle 23 and separated therefrom about 4 inches is an intermediate baffle 24. Whereas the top of baffle 23 terminates wel below the water line in the compartment, the baffle 24 extends above the wattr line. At the bottom, baffle 24 is spaced from the bottom corner of the tank about 6 inches, for example. A third baffle 25, which is uppermost and also extends above the water line, may be spaced about 6 inches from the baffle 24. At the bottom, baffle 25 terminates substantially above the other baffles, e.g. two feet above the tank bottom.

A second air line 26 is disposed between the baffles 23 and 24 adjacent the bottom ends thereof, as shown in FIG. 4 and with the air discharging from this line through orifices along the top a pumping or circulating action is created which serves to withdraw sludge settled in the bottom of the half V-shaped pocket 27 formed between the baffles and the adjacent side wall of compartment 14. The flow induced by air discharging from line 26 and rising between baffles 23 and 24 lifts the settled sludge between the baffles 23 and 24 and discharges it above baffle 23 and near the water line, as indicated by the arrows in FIG. 4. The air line 26 in addition to serving to return or recycle the settled sludge from pocket 27 also serves to supply the balance of the normal oxygen requirements for the aeration zone in the compartment not supplied by line 21.

The intermediate baffle 24 is provided at regularly spaced intervals (e.g. every 4 feet) with intake connections 28—28 which may take the form of short sleeves having cross sections of approximately 6 inches by 6 inches if square, or diameters of about 6 inches if circular. The liquid in the compartment 14 to the left of the slanted baffles (as viewed in FIG. 3) flows into and through these intakes 28—28 in response to the circulating action induced by the air line 26.

The baffles 23, 24 and 25, or aligned extensions thereof, and the air lines 21 and 26, are continued in the primary compartment 7 so as to establish a half V-shaped pocket 29 (FIG. 1) along the adjacent side wall which in effect is a continuation of pocket 27, but separated therefrom by the separator 6.

In operation, the installation described in the drawings operates in the following manner:

The influent comes in to the primary compartment 7 through the header 8 and is distributed down through the down-comers 10 to the bottom of the tank. It leaves the bottom ends of the down-comers and spreads out along the tank bottom and then begins to rise through the layer of anaerobic sludge with the result that the incoming waste material is subjected to anaerobic fermentation. The sludge level being relatively thick also serves as a mechanical fluid filter media to separate or hold back solids that may be in the inffluent.

Above the sludge level 12 in compartment 7, the liquid is undergoing both aeration and agitation. Aerobic treatment is taking place in this zone with activated sludge being distributed throughout. Accordingly, the waste material in the primary aeration compartment, is first subjected to anaerobic fermentation and then aerobic oxidation. Ammonia in sewage is oxidized to nitrates and nitrites in aeration compartment 7 and after the mixture passes into settling compartment 7 dentifrification takes place which tends to float the activated sludge particles therein.

The discharge from the settling pocket 7 on the side of the aeration compartment 7 flows out through the trough 13 by gravity into the distributor trough 15 in compartment 14. This partially treated or purified liquid, contains substantial quantities of entrained activated sludge, and is distributed through the down-comers 16 along the bottom of the compartment 14 and rises upwardly through the bed or layer of sludge 20 so as to undergo anaerobic fermentation or treatment. In the aeration zone or layer above the sludge layer 20 in compartment 14 the waste material undergoes further aerobic oxidation of the activated sludge process with the result that the final effluent discharged through the trough 18 is typically purified to 10 p.p.m. B.O.D. and from 15–20 p.p.m. suspended solids. It will be understood that these figures are given as illustrative and that the installation may not always be operated at the high efficiencies which these values indicate. The nitrates and nitrites carried over from compartment 7 are removed or destroyed in the sludge layer 20 in compartment 14. As a result of this de-nitrifying action the tendency of the activated sludge particles to float by bubbles of nitrogen and carbon dioxide gas attaching is removed. Therefore the sludge settles much better in the V-shaped pocket 27 and very little sludge is lost in the effluent.

The function of the sets of baffles 23–24–25 is the same in each of the compartments 7 and 14. Referring to FIG. 4, the liquid in the aeration compartment 7 flows through the inlet connections 28 and down between the baffles 24 and 25 as indicated by the arrows. By reason of the current induced by air supplied by line 26, most of the down-flowing liquid current at the bottom end of the baffle 23 is recycled or recirculated around the bottom end of the baffle 24 and up through the space between the baffles 23 and 24. For example, for every 10 volumes of liquid that are recycled through the space between the baffles 23 and 24, only about one volume rises through the settling compartment 27. The flow or circulation pattern of the liquid at the left of the baffles in the aeration zone is indicated in FIG. 3.

Since substantial quantities of air are normally required to conduct the aeration and provide the dissolved oxygen in the supernatant zones in compartments 7 and 14, full advantage is taken of the lifting effects of this air requirement to produce both the desired efficient circulation and aeration, and to return a large proportion of the settled activated sludge from the bottom of the settling pockets 29 and 27 in the chambers 7 and 14, respectively. For example, in the above described installation activated sludge is returned from the settling zones in about 20–40 times that returned in a conventional activated sludge sewage treatment plant. Furthermore, the returned or recycled activated sludge carries with it large quantities of dissolved oxygen, this action not being found in the conventional activated sludge installation.

The air lift effect is supplied by air line 26 with the remaining air required for oxidation or purification being supplied by line 21. In operation adjustment may be readily made so that turbulence will occur in the supernatant layers only in the compartments 7 and 14, and quiescence will obtain in the lower layers of anaerobic sludge. Thus, the counter-flow effects produced by introducing the air requirements through lines 21 and 26 combine or act to reduce velocities so as to prevent disturbance in the lower layers.

When properly operated, the activated sludge formed in the process is all consumed therein and the only products are clear, low B.O.D. effluent and anaerobic sludge. The latter of both compartments 7 and 14 must be removed periodically by pumping, always leaving a layer of sludge of effective depth in each compartment.

Operation of the process in two stages or treating compartments is preferred. While, a third stage or compartment might be added it has not been found necessary. Operation in one-stage or compartment is a possibility, but not now considered desirable.

If desired activated sludge, which is air-lifted from the bottoms of the settling pockets 27 and 29 may be returned to the bottom layers of anaerobic sludge in compartments 14 and 7, respectively. This is accomplished by extending the upper end of the baffle 23 high enough so that the lifted sludge can be directed into the distributors or headers 8 and 15. Such an extension of the baffle 23 is indicated in broken line at 23' in FIG. 3. For example, the upper end of the baffle 23 can be so extended as to deliver the air-lifter sludge directly into the headers 8 and 15. When the sludge is returned to one of the headers 8 or 15 so that it is introduced near the bottom of one of the layers of anaerobic sludge, there will be a substantial reduction in the concentration of activated sludge solids in the aerated supernatant layers wherein aerobic biological oxidation is occurring.

It will be understood that numerous modifications and changes of a design nature may be made in the apparatus and operations described above in connection with the drawings without departing from the spirit and scope of the invention. Accordingly, the described apparatus and operations are intended to be interpreted as illustrative and not in a limiting sense.

We claim:

1. The method of treating sewage and industrial waste which comprises, introducing sewage or industrial waste influent adjacent the bottom of a compartment containing a bottom quiescent layer of anaerobic sludge in which anaerobic action is occurring and an aerated supernatant layer containing suspended activated sludge in which aerobic biological oxidation is occurring, allowing the introduced sewage or industrial waste to rise through said bottom layer into said supernatant layer, withdrawing liquid from said supernatant layer into a separate settling pocket, returning settled activated sludge from said settling pocket into liquid in said compartment, and withdrawing supernatant liquid from said settling pocket to compensate for influent introduced into said compartment, a portion of the air required for aeration of said supernatant layer being used to effect said return of settled activated sludge, said bottom layer of anaerobic sludge having a consistency appreciably greater than that of water and serving as a filter to mechanically separate solid matter from said influent as it rises therethrough.

2. The method of claim 1 wherein said settled sludge is returned into said supernatant layer in said compartment.

3. The method of claim 1 wherein said settled sludge is returned into said layer of anaerobic sludge in said compartment.

4. The method of claim 1 wherein effluent from said first compartment is introduced as influent in a second compartment wherein it is subjected to corresponding treatment.

5. The method of claim 4 in which substantially all of the activated sludge formed in carrying out the method is consumed therein and purified effluent and anaerobic sludge are the products of the method.

6. The method of treating sewage and industrial waste which comprises, introducing sewage or industrial waste influent adjacent the bottom of a compartment containing a bottom quiescent layer of anaerobic sludge in which anaerobic action is occurring and an aerated supernatant layer containing suspended activated sludge in which aerobic biological oxidation is occurring, allowing the introduced sewage or industrial waste to rise through said bottom layer into said supernatant layer, withdrawing liquid from said supernatant layer into a separate settling pocket, returning settled activated sludge from said settling pocket into said influent, withdrawing supernatant liquid from said settling pocket to compensate for influent introduced into said compartment and introducing it adjacent the bottom of a second compartment containing a bottom quiescent layer of anaerobic sludge in which anaerobic action is occurring and an aerated supernatant layer containing suspended activated sludge in which aerobic biological oxidation is occurring, allowing the liquid introduced from said first compartment to rise through said bottom layer into said supernatant layer in said second compartment, withdrawing liquid from said supernatant layer into a second settling pocket, returning settled activated sludge from said second settling pocket into liquid in said second compartment, and discharging treated supernatant liquid from said second settling pocket to compensate for liquid introduced into said second compartment from said first compartment, a portion of the air required for aeration of each of said supernatant layers being used to effect said return of settled sludge from said first and second settling pockets, said bottom layers of anaerobic sludge having consistencies appreciably greater than that of water and each serving as a mechanical filter to separate solid matter from liquid rising therethrough.

7. Apparatus having at least one compartment wherein sewage or industrial waste may be subjected to both anaerobic and aerobic treatment comprising, means providing a liquid-holding compartment, conduit means for introducing influent sewage or waste into said compartment adjacent the bottom thereof, a sandwich of three spaced baffles walling off an activated sludge settling zone in a portion of said compartment, the outside baffle on on the side away from said settling zone extending all the way to the bottom of said compartment and terminating at the top below the normal operating liquid level therein, the second outside baffle on the side toward said settling zone terminating above the bottom of said compartment and extending above said liquid level, with the intermediate baffle terminating above the bottom of said compartment and extending above said liquid level, at least one conduit means having an inlet located below said liquid level in the main portion of said compartment and a discharge into the space between said second outside baffle and said intermediate baffle below said liquid level, and an air inlet line disposed generally horizontally between said first outside baffle and said intermediate baffle adjacent the lowermost end of the latter whereby air rises from said line between said first outside baffle and said intermediate baffle and lifts settled activated sludge from the bottom of said settling zone and discharges it at the upper end of said first outside baffle into the upper main portion of said compartment, and an effluent weir in said settling zone disposed to define said normal operating liquid level and providing for the discharge of treated effluent from said compartment.

8. The apparatus of claim 7 wherein conduit means for introducing influent comprises an approximately level header pipe disposed above said normal operating liquid level and a plurality of down-comers extending downwardly from said header to adjacent the bottom of said compartment.

9. The apparatus of claim 7 wherein said baffle sandwich is inclined with the upper end overhanging liquid in said main portion of the compartment.

10. The apparatus of claim 7 wherein the bottom end of said intermediate baffle is at a level intermediate the compartment bottom and the lower end of said second outside baffle.

11. The apparatus of claim 7 wherein said first outside baffle terminates sufficiently above the normal operating liquid level in said compartment to permit lifted settled sludge to discharge into said first conduit means.

12. The apparatus of claim 7 wherein said sandwich of baffles extends along one side wall of said compartment and a second air line extends along the opposite side wall at an intermediate depth for producing an air-lift effect on the liquid adjacent said opposite side wall and above said second air line.

References Cited in the file of this patent

UNITED STATES PATENTS

| | | |
|---|---|---|
| 1,139,024 | Frank | May 11, 1915 |
| 1,223,427 | Scarborough | Apr. 24, 1917 |
| 1,700,722 | Imhoff | Jan. 29, 1929 |
| 2,473,323 | Zack | June 14, 1949 |
| 2,889,929 | Kivell | June 9, 1959 |

OTHER REFERENCES

"Raw Sewage Stabilization Ponds in The Dakotas," Towne et al., Sewage and Industrial Wastes, vol. 29, April 1957, pp. 377–396.

"Algae in Waste Treatment," Oswald et al., same citation as above, pp. 437–459.

UNITED STATES PATENT OFFICE

CERTIFICATE OF CORRECTION

Patent No. 3,168,465                        February 2, 1965

Leon S. Kraus et al.

It is hereby certified that error appears in the above numbered patent requiring correction and that the said Letters Patent should read as corrected below.

In the grant, lines 1 and 2, and line 11, and in the heading to the printed specification, line 5, name of second inventor, for "Edwin B. Falls, Jr." each occurrence, read -- Edwin B. Fall, Jr. --; column 2, line 60, for "invnetion" read -- invention --; column 4, line 34, for "wel" read -- well --; line 35, for "wattr" read -- water --; column 6, lines 28 and 29, strike out "Such an extension of the baffle 23 is indicated in broken line at 23' in FIG. 3." and insert the same after "15." in line 32, same column 6.

Signed and sealed this 29th day of June 1965.

(SEAL)
Attest:

ERNEST W. SWIDER                          EDWARD J. BRENNER
Attesting Officer                            Commissioner of Patents